April 13, 1943.   F. VAN HAFTEN   2,316,375
SORTING MACHINE FEEDING AND EJECTING DEVICE
Original Filed Jan. 13, 1941   2 Sheets-Sheet 1

INVENTOR.
Freeman Van Haften
BY Earl D. Chappell

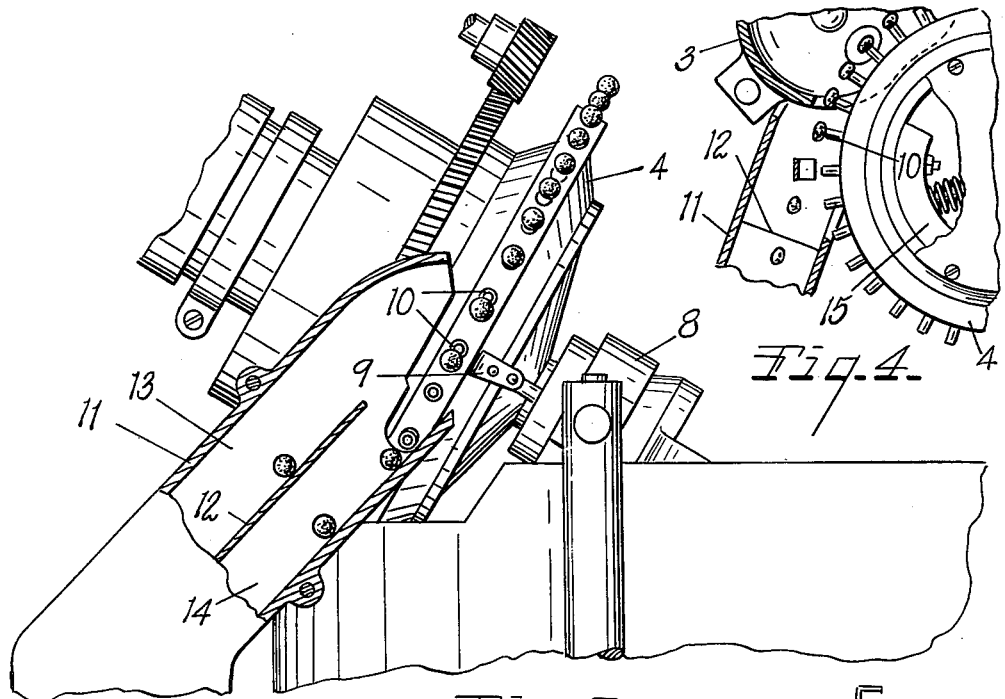
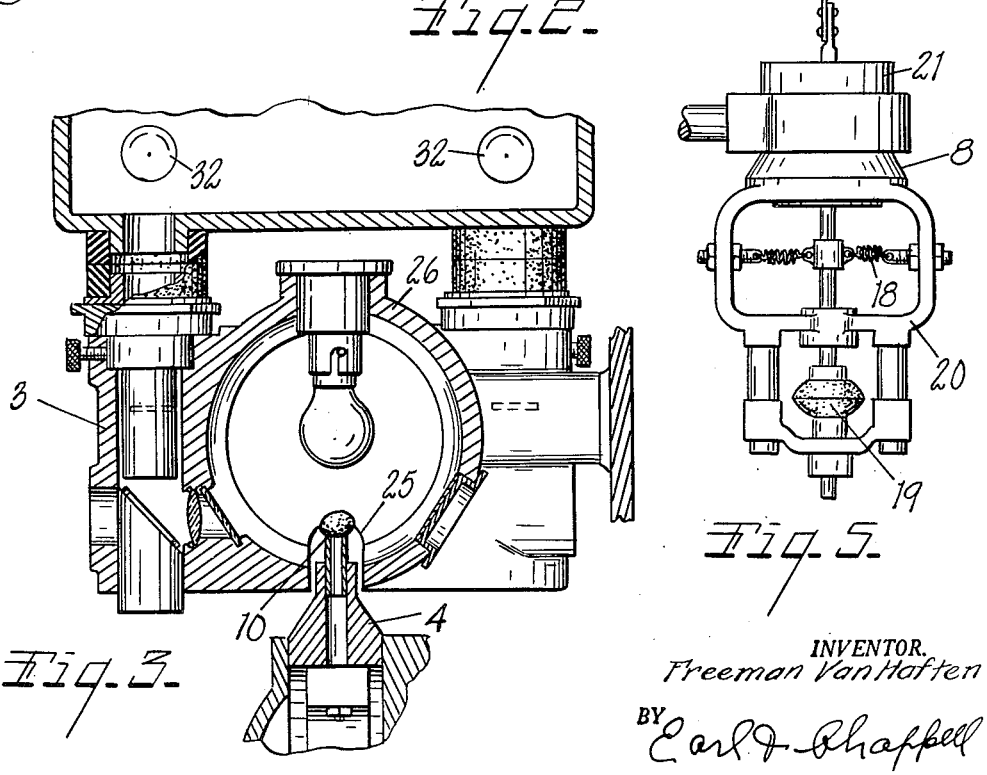

Patented Apr. 13, 1943

2,316,375

UNITED STATES PATENT OFFICE 2,316,375

SORTING MACHINE FEEDING AND EJECTING DEVICE

Freeman Van Haften, Grand Rapids, Mich., assignor to Electric Sorting Machine Company, Grand Rapids, Mich., a corporation of Michigan Original application January 13, 1941, Serial No. 374,224. Divided and this application February 16, 1942, Serial No. 431,101

14 Claims. (Cl. 209—111)

This invention relates to improvements in sorting machine feeding and ejecting device.

This is a division of the joint application of David C. Cox and Freeman Van Haften, Serial No. 374,224, filed January 13, 1941, and entitled "Sorting machines," which is being converted to a sole application in the name of said Cox by appropriate disclaimer by Van Haften and sole oath by Cox.

The main objects of this invention are:

First, to provide in a sorting machine embodying a conveyor in which objects such as beans, peas, peanuts, coffee beans, corn and other articles to be sorted are carried to a viewing point and thereafter effectively released from the conveyor by breaking the holding suction and associating an ejecting means with the articles so released.

Second, to provide in a sorting machine an improved ejecting means which is highly operative and efficient in its operation.

Third, to provide article feeding means for a sorting or like means having means for operating on articles, wherein the articles are transported by mechanical means for a predetermined distance to a predetermined point and caused thereafter to flow in a steady stream free from said means past said operating means for operation thereon by the latter, thereby overcoming certain important drawbacks characterizing heretofore employed structures for feeding and ejecting or the like.

Fourth, to provide feeding and operating means of the foregoing type wherein articles are unfailingly disengaged from the feeding means so as to pass the operating means in a steady stream, including improved structural details for insuring said disengagement.

Further objects relating to details and economies of my invention will appear from the description to follow. The invention is defined in the claims.

A structure embodying the features of my invention is illustrated in the accompanying drawings, wherein:

Fig. 2 is an enlarged fragmentary view in side elevation, partially broken away and in vertical section illustrating the manner in which articles which are discharged, ejected or operated on, after being transported by a conveyor to an ejecting or operating station, in accordance with the principle of the present invention.

Fig. 3 is a fragmentary view partially broken away and in section to ilustrate the relation of the photoelectric article viewing apparatus of the sorting machine in which the present invention is embodied, in operative relation to an article conveyor constituting part of the feeding and ejecting structure of the present invention.

Fig. 4 is a fragmentary view in side elevation partially broken away and in vertical section, ilustrating structural details whereby the disengagement of the article from the feed conveyor at a predetermined point is assured, thereby producing a flow thereof in a steady stream past the ejector or operating means as contemplated by my invention.

Fig. 5 is a fragmentary plan view generally illustrating the ejector per se of the present invention.

Figure 1:
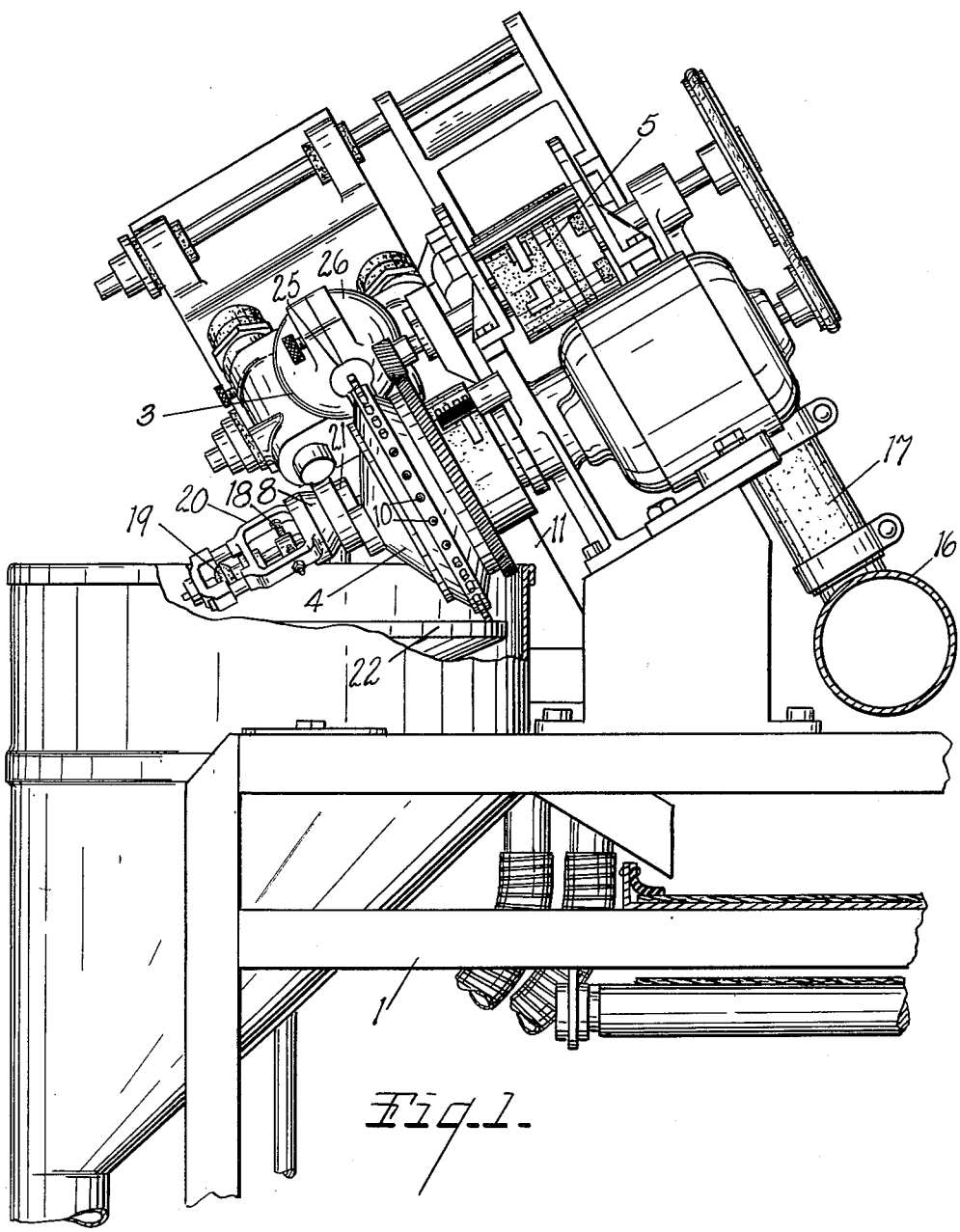
Fig. 1 is a fragmentary side elevational view, partially in vertical section, illustrating a sorting machine with which the feeding and ejecting or operating structure of my invention is associated.

This invention relates to improvements in a sorting machine for the sorting of homogeneous objects such as beans, peas, peanuts, coffee beans, corn and the like according to the color and shape or light reflecting characteristics. Machines of this type are illustrated in the patent to Hansen No. 2,054,320 of September 15, 1936, and in the patents to David C. Cox, Nos. 2,131,095 and 2,131,096 of September 27, 1938, and No. 2,152,758 of April 4, 1939.

The present invention relates generally to an ejecting device for a sorting machine of the foregoing character, although it will be appreciated that the utility of the present invention is not limited to application in a sorting machine, hence I desire it to be understood that in employing the terms "sorting," "ejecting means," "ejector," "discharge," "hammer," and the like in the description to follow, such terms are employed only for purposes of convenience and are to be construed broadly to cover any appropriate operating means effective on the articles for one purpose or another. The present invention is concerned primarily with a structure wherein the articles are mechanically transported past an operating or ejecting station on a wheel or drum having an aligned series of seats in communication with a partial vacuum within the drum for the purpose of holding the articles on said seats during the period that they are being transported to and past the operating station. I have found that certain articles have a tendency to resist dislodgement from the seats unless means is provided to overcome said tendency or may even be drawn back upon a seat after partial, or in some instances, complete dislodgement.

Briefly stated, the invention consists in cutting off the holding suction or vacuum from the seats at a point in advance of the ejecting point or station, so as to release the articles and permit them to move past the ejecting station in a stream and completely out of contact with the seats. This eliminates certain defects in previous structures which may be briefly noted. Thus, a lightweight, irregular or spongy article in some instances has a tendency to be merely spun around on the suction seat when struck by the ejector, without leaving the seat or, as sometimes happens, it is but partially removed from the seat, to return thereto under the influence of the suction effective on the seat as soon as the ejector hammer has been retracted. It will be apparent that an ejector striking a soft, spongy article is incapable of projecting the same with the same force of rebound as when it strikes a relatively firm, solid article. However, cutting off the suction in advance of the ejection point and permitting the articles to leave the seats under the influence of gravity and such centrifugal force as may be present, I eliminate this tendency to resist displacement or to return to the seats and the factor of inefficiency in the sorting operation which it introduces.

Releasing the articles from the suction seats prior to striking the same with the ejector is likewise desirable when certain irregular and ofttimes pointed articles, such as kernels of corn, are sorted. These sometimes tend to be drawn onto the suction seats thereof extending downward into the interior of the seat. When struck by the ejector in such position, they are in many cases sheared off, which not only damages the kernel, which is often being sorted for use as seed, but also is apt to cause clogging of the suction channel, or at least an undesirable drawing of particles into the interior of the suction conveyor. In freeing the articles from the seats prior to ejecting the same, I eliminate this difficulty. It will be appreciated that since the operation of the ejector in discharging the articles is extremely rapid, this is an important accomplishment. In certain practical embodiments, the ejector has been operated at sixty-five strokes per second when continuously energized.

Details of the sorting apparatus generally with which the structure of the present invention is embodied for purposes of illustration are illustrated and described at some length in the above identified application of Cox, Serial No. 374,224, hence will be only briefly referred to herein. As viewed in Fig. 1, the sorting machine includes a frame I having mounted thereon an illuminating and viewing mechanism designated generally by the reference numeral 3, adapted to illuminate and photoelectrically inspect articles translated through said mechanism by the rotary, drum-like, suction conveyor 4, the axis of which is inclined as illustrated in Figs. 1 and 2. This disposes the path of travel of the articles in an inclined, generally vertical plane. Details of structure of both mechanism 3 and the conveyor 4, and particularly the latter, since it relates to the present invention, will be referred to in the description to follow.

Driven in synchronism with the conveyor 4 is a suitable commutator 5 for timing the electrical energization of certain photoelectric classifying instrumentalities, and the hookup therefor, which do not constitute part of the present invention, and other driven elements associated therewith are driven from a motor mounted on the frame I.

An ejector mechanism controlled by the aforesaid photoelectric classifying or like instrumentalities is illustrated as to certain features in Figs. 1, 2 and 5, and is generally designated by the numeral 8. This in the embodiment illustrated includes a solenoid or electromagnet actuated tappet, blade or ejector 9 adapted, when the solenoid is electrically energized by the electrical instrumentalities referred to, to be projected across the path of the objects sorted to strike and eject an article into a receiving or discharge device II (see Figs. 2 and 4) which is associated with the frame in receiving relation to the conveyor.

The articles to be sorted are conveyed to the sorting point in the spaced series on the individual, hollow, sleeve-like radially projecting seats 10 on the conveyor 4, spaced circumferentially therearound.

Receiving device II is in the form of a hollow downwardly inclined tube or chute divided by a partition 12 into two parallel passages 13, 14, the latter of which is disposed in a plane intersecting the plane of the path of articles on conveyor 4 so as to receive the articles when they are normally released and dropped from the article seats on said conveyor. The upper chute passage 13 receives the articles when they are displaced by ejector 9.

A substantial vacuum holding the articles on the seats, so as to convey the same through the viewing mechanism 3, exists interiorly of the conveyor, which vacuum is cut off at a point in the article travel immediately preceding ejector 8 by a hollow arcuate shoe 15 disposed interiorly of the conveyor (see Fig. 4) and spring urged against its inner periphery. The interior of hollow shoe 15 is at atmospheric pressure. The remainder of the interior of the conveyor 4 is in communication with a vacuum header 16 (shown in Fig. 1) by means of a branch pipe 17.

In the present machine, provision is made that the vacuum is cut off by shoe 15 at a point just past or at the rear of the viewing mechanism 3 and substantially and in advance of ejector 9. By reference to the drawings it will be noted that this point is located well beyond the top of the annular path traced by the articles and on the side of the conveyor on which the articles are moving downwardly, being disposed approximately half way between the top and bottom of the conveyor. Accordingly the articles are mechanically supported and conveyed for viewing or scanning, but when they reach the ejector they have been released from this support and are falling in a stream free from and out of contact with the suction seats on which they were previously transported.

The foregoing arrangement eliminates the likelihood of failure to discharge an article should it be soft or spongy in character, or of a shape or having some other characteristic causing the same to simply shift around slightly on the seat when engaged by the ejector, on being drawn back on the seat after being removed therefrom. Likewise, it eliminates possibility of shearing off an article leaving the seat clogged and thereafter useless, all as discussed above.

Ejector 9, when actuated, strikes an article to be ejected with sufficient force to deflect the same from its normal path through the air into the upper passageway 13 of chute 11. It is contemplated that defective or discolored articles will be ejected to this passage, however it will of course be evident that arrangements can be made whereby acceptable articles, or articles of acceptable color or shade are deflected into passage 13 and defective or non-acceptable articles allowed to fall into passage 14, if such is desired, this involving mainly a manipulation or adjustment of mechanisms not involved in the present subject matter.

The ejector mechanism 8, shown in Fig. 5, corresponds generally to that shown and described in the patent to Cox, No. 2,152,758, of Apr. 4, 1939, including lateral springs 18, which serve to retract the ejector 9 and a bumper 19 cushioning the latter on its rear stroke, all mounted in a suitable supporting frame 20 on which the solenoid or electromagnet 21 actuating the ejector 9 is also carried.

The articles are fed successively to the conveyor wheel or drum 4 by means of a concave, bowl-like feed member 22, suitably supported and rotated in the manner fully illustrated and described in said copending application of Cox identified above.

Illumination and viewing of the articles as they are transported on the conveyor seats 10 prior to reaching the suction cutoff point described above is likewise clearly illustrated and described in said Cox application; however, in Fig. 3 I illustrate in general the photoelectric illuminating and viewing mechanism 3 in the operative relationship thereof to the article conveyor 4. The latter transports articles on the seats 10 through openings 25 in an illuminating and viewing housing 26. As pointed out in the said Cox application both sides of each article are successively viewed as it passes through the housing, at which time the article is photoelectrically viewed by photo tubes 32 through the lens and reflector structure illustrated in Fig. 3.

It will be understood that the electrical sorting impulses arising in the photo tubes 32 are, in the embodiment illustrated, amplified and applied through suitable electrical circuits not pertinent to the present invention to the coil of electromagnet 8 to effect actuation of the ejector 9. Any other desired operating device could be similarly controlled.

The present invention provides an article conveying and operating structure which is primarily characterized by the unfailing operation which it insures and by the elimination of any factors tending to reduce the output capacity of the machine as a whole by failure of the operating device to disengage an article from its seat on the conveyor, when such disengagement is indicated.

An embodiment of the invention which incorporates the principles of the invention in a highly desirable manner has been illustrated and described. It should be understood that the foregoing terminology is used only descriptively rather than in a limiting sense, and with full intention to include equivalents of the features shown and described, within the scope of the following claims.

Having thus described my invention, what I claim as new and desire to secure by Letters Patent is:

1. A feeding and operating device of the type described, comprising in combination a hollow rotatable drum-like conveyor having a plurality of open article seats on the periphery thereof in communication with the interior thereof, means for creating a suction interiorly of said conveyor effective at said seats to pick up articles past which the conveyor travels and hold the same on said seats for a substantial travel, an arcuate hollow shoe within said conveyor in sliding engagement with the internal periphery thereof adjacent said seats, the interior of said shoe being at such pressure as to nullify the effect of the conveyor suction at said seats to hold articles thereon, whereby said articles disengage from said seats and travel therefrom in a steady linear stream, operating means positioned adjacent said drum to the rear of the point of suction cutoff, with reference to the direction of rotation of the conveyor, effective to operate on articles in said stream when actuated, and photoelectrically controlled means for actuating said operating mechanism, including an article illuminating and viewing housing through which articles on said seats pass in advance of the point of suction cutoff.

2. A feeding and operating device of the type described, comprising in combination a hollow rotatable drum-like conveyor having a plurality of open article seats on the periphery thereof in communication with the interior thereof, means for creating a suction interiorly of said conveyor effective at said seats to pick up articles past which the conveyor travels and hold the same on said seats for a substantial travel, an arcuate hollow shoe within said conveyor in sliding engagement with the internal periphery thereof adjacent said seats, the interior of said shoe being at such pressure as to nullify the effect of the conveyor suction at said seats to hold articles thereon, whereby said articles disengage from said seats and travel therefrom in a steady linear stream, photoelectric means positioned in advance of the point of suction cutoff to inspect said articles while the same are retained on said seats, and operating means positioned adjacent said drum to the rear of the point of suction cutoff, with reference to the direction of rotation of the conveyor, effective to operate on articles in said stream when actuated, while the articles are disengaged from said seats.

3. A feeding and operating device of the type described, comprising in combination a hollow rotatable drum-like conveyor having a plurality of open article seats on the periphery thereof in communication with the interior thereof, means for creating a suction interiorly of said conveyor effective at said seats to pick up articles past which the conveyor travels and hold the same on said seats for substantial travel, an arcuate hollow shoe within said conveyor in sliding engagement with the internal periphery thereof adjacent said seats, the interior of said shoe being at such pressure as to nullify the suction effective on said seats to hold articles thereon whereby said articles disengage from said seats and travel therefrom in a steady linear stream, operating means positioned adjacent said drum including an operating member reciprocable tangentially and transverse the plane of rotation of said drum, said operating member being located to the rear of the point of suction cutoff with reference to the direction of rotation of the conveyor, whereby to operate on articles in said stream when actuated, and photoelectrically controlled means for actuating said operating means, said photoelectrically controlled means being positioned adjacent said conveyor in advance of the point of suction cutoff to inspect said articles while they are retained on said seats.

4. A feeding and operating device of the type described, comprising in combination a hollow rotatable drum-like conveyor having a plurality of open article seats on the periphery thereof in communication with the interior thereof, an illuminating and viewing housing adjacent said conveyor through which the articles are translated by the conveyor, said housing being provided with means for illuminating and viewing the articles on the conveyor, means for creating a suction interiorly of said conveyor effective at said seats to pick up articles past which the conveyor travels and hold the same on said seats for substantial travel in said housing for inspection by said viewing means, an arcuate hollow shoe within said conveyor in sliding engagement with the internal periphery thereof adjacent said seats, the interior of said shoe being at such pressure as to nullify the suction effective on said seats to hold articles thereon whereby said articles disengage from said seats and travel therefrom in a steady linear stream, and operating means positioned adjacent said drum including an operating member reciprocable tangentially and transverse the plane of rotation of said drum, said operating member being located externally of said housing and to the rear of the point of suction cutoff with reference to the direction of rotation of the conveyor, whereby to operate on articles in said stream when actuated.

5. A feeding and operating device of the type described, comprising in combination a hollow rotatable drum-like conveyor having a plurality of open article seats on the periphery thereof in communication with the interior thereof, a viewing housing positioned adjacent said conveyor through which said articles are translated by the conveyor, said housing being provided with means for viewing articles as they are translated, means for creating a suction interiorly of said conveyor effective on said seats to pick up articles past which the conveyor travels and hold the same on said seats for substantial travel, an arcuate hollow shoe within said conveyor in sliding engagement with the internal periphery thereof adjacent said seats, the interior of said shoe being at such pressure as to nullify the suction effective on said seats to hold articles thereon whereby said articles disengage from said seats and travel therefrom in a steady linear stream, and operating means positioned adjacent said drum externally of said housing and to the rear of the point of suction cutoff with reference to the direction of rotation of the conveyor, adapted to operate on articles in said stream when actuated.

6. In a machine of the type described, the combination of a rotatable suction conveyor provided with an annular series of radially disposed hollow suction seats having suction orifices at the outer ends thereof, means for supplying articles to said conveyor to be picked up by said suction seats as the conveyor rotates, means for successively interrupting the suction on said suction seats on the down sweep thereof so that the articles successively drop from said seats in an alined series or stream, a housing through which the articles are translated by said conveyor provided with photoelectric article viewing means operatively associated with said conveyor to successively view the articles translated thereby and while they are carried in the housing by said suction seats, and operating means controlled by said photoelectric viewing means and effective when actuated to deflect the articles from said stream after they have left the housing.

7. In a machine of the type described, the combination of a rotatable suction conveyor provided with an annular series of open suction seats, means for supplying articles to said conveyor to be picked up by said suction seats as the conveyor rotates, means for successively interrupting the suction on said suction seats so that the articles successively are released from and leave said seats in an alined series or stream, a housing through which the articles are translated by said conveyor provided with photoelectric article viewing means operatively associated with said conveyor to successively view the articles translated thereby and while they are carried in the housing by said suction seats, and operating means controlled by said photoelectric viewing means and effective when actuated to deflect the articles from said stream after they have left the housing.

8. In a sorting machine, the combination of a rotatable suction conveyor provided with an annular series of radially disposed suction nipples having suction orifices at the outer ends thereof, means for supplying articles to said conveyor to be picked up by said suction nipples as the conveyor rotates, means for successively breaking the vacuum on said suction nipples on the down sweep thereof so that the articles successively drop from said suction nipples in alined series or stream, a photo-electric article viewing means operatively associated with said conveyor to successively view the articles translated thereby and while they are carried by said suction nipples, and ejecting means operatively associated with and controlled by said photoelectric viewing means comprising a tappet and reciprocating across the path of the falling articles.

9. In a sorting machine, the combination of a rotatable suction conveyor provided with an annular series of radially disposed suction nipples having suction orifices at the outer ends thereof, means for supplying articles to said conveyor to be picked up by said suction nipples as the conveyor rotates, means for successively breaking the vacuum on said suction nipples on the down sweep thereof so that the articles successively drop from said suction nipples in an alined series or stream, a photoelectric article viewing means operatively associated with said conveyor to successively view the articles translated thereby and while they are carried by said suction nipples, and ejecting means controlled by said photoelectric viewing means and acting to eject certain of the falling articles from said stream thereof.

10. In a sorting machine, the combination of a rotatable suction conveyor provided with a series of suction orifices, means for supplying articles to said conveyor to be picked up by said suction orifices as the conveyor rotates, means for successively breaking the vacuum on said suction orifices on the down sweep thereof so that the articles successively drop from said suction orifices in an alined series or stream, an article viewing means operatively associated with said conveyor to successively view the articles translated thereby while they are carried by said suction orifices, and ejecting means operatively associated with and controlled by said viewing means comprising a tappet reciprocating across the path of the falling articles.

11. In a sorting machine, the combination of a rotatable suction conveyor provided with a series of suction orifices, means for supplying articles to said conveyor to be picked up by said suction orifices as the conveyor rotates, means for successively breaking the vacuum on said suction orifices on the down sweep thereof so that the articles successively drop from said suction orifices in an alined series or stream, an article viewing means operatively associated with said conveyor to successively view the articles translated thereby while they are carried by said suction orifices, and ejecting means controlled by said photoelectric viewing means and acting to eject certain of the falling articles from said stream thereof.

12. In a sorting machine, the combination of a conveyor provided with a series of article retaining and transporting suction orifices, light sensitive viewing means operatively associated with said conveyor at a predetermined point for viewing the articles while they are retained on said suction orifices, means for breaking the suction of said suction orifices at a predetermined point to the rear of said viewing point whereby the articles depart from engagement with the conveyor in an alined series or stream, and ejecting means controlled by said viewing means and acting to eject selected articles from said stream while they out of engagement with said conveyor.

13. In a sorting machine, the combination of a conveyor provided with a series of suction orifices, a housing through which articles are translated on said conveyor provided with a light sensitive viewing means positioned for viewing articles successively as they are translated by said conveyor and retained on the suction orifices thereof, means for releasing the articles from said suction orifices at a point at the rear of said viewing point and so that the articles are released tangentially of said orifices externally of said housing in an alined series or stream, and ejecting means controlled by said viewing means positioned externally of said housing and acting to eject articles from said stream.

14. In a sorting machine, the combination of a conveyor for translating articles to be sorted in an alined series, a photoelectric article viewing means operatively associated with said conveyor to successively view the articles translated thereby and while they are carried by said conveyor, means acting to discharge the articles from said conveyor at a point at the rear of said viewing means and so that the articles discharged fall in an alined series or stream, and ejecting means controlled by said photoelectric viewing means and acting to eject articles from said stream while they are out of engagement with said conveyor.

FREEMAN VAN HAFTEN.